United States Patent
Tabarelli de Fatis

(10) Patent No.: US 8,425,794 B2
(45) Date of Patent: Apr. 23, 2013

(54) COMPOSITION AND METHOD FOR PRODUCING AN INSULATING PRODUCT

(75) Inventor: Stafano Tabarelli de Fatis, Schio (IT)

(73) Assignee: Basic & Co. S.r.l. (IT)

( * ) Notice: Subject to any disclaimer, the term of this patent is extended or adjusted under 35 U.S.C. 154(b) by 257 days.

(21) Appl. No.: 12/682,009

(22) PCT Filed: Oct. 6, 2008

(86) PCT No.: PCT/IB2008/002641
§ 371 (c)(1),
(2), (4) Date: Jul. 23, 2010

(87) PCT Pub. No.: WO2009/047612
PCT Pub. Date: Apr. 16, 2009

(65) Prior Publication Data
US 2010/0282997 A1  Nov. 11, 2010

(30) Foreign Application Priority Data
Oct. 9, 2007 (IT) .............................. MO2007A0307

(51) Int. Cl.
| C04B 28/26 | (2006.01) |
| C04B 38/02 | (2006.01) |
| B30B 5/06 | (2006.01) |
| B28B 5/02 | (2006.01) |
| B28B 11/12 | (2006.01) |
| B28B 11/16 | (2006.01) |
| B28B 11/24 | (2006.01) |

(52) U.S. Cl.
USPC .............. 252/62; 106/601; 106/603; 106/600

(58) Field of Classification Search ................... 252/62; 106/603, 601
See application file for complete search history.

(56) References Cited

U.S. PATENT DOCUMENTS

| 3,988,161 A | 10/1976 | Kaneko et al. |
| 4,328,034 A | 5/1982 | Ferguson |
| 5,256,222 A | 10/1993 | Sheperd et al. |
| 6,497,945 B1 | 12/2002 | Niedner et al. |

FOREIGN PATENT DOCUMENTS

| DE | 19542069 A1 | 5/1996 |
| DE | 19923493 A1 | 4/2000 |
| EP | 0299482 A2 | 1/1989 |
| FR | 2464978 A1 | 3/1981 |
| GB | 933410 | 8/1963 |
| GB | 1389565 | 4/1975 |
| JP | 0910685 A | 1/1997 |
| RU | 2087447 * | 8/1997 |
| RU | 2087447 C1 | 8/1997 |
| WO | 2008157714 A1 | 12/2008 |

OTHER PUBLICATIONS

Translation for RU 2087447, Aug. 20, 1997.*

* cited by examiner

*Primary Examiner* — Carol M Koslow
(74) *Attorney, Agent, or Firm* — Laubscher & Laubscher, P.C.

(57) ABSTRACT

A method for producing a finely subdivided insulating material includes the steps of: preparing a fluid composition by mixing together an alkaline silicate, a metal hydroxide and an impermeabilizing agent, heat-treating the composition so as to produce a plurality of small cavities in the composition, and finely subdividing the composition.

2 Claims, 2 Drawing Sheets

COMPOSITION AND METHOD FOR PRODUCING AN INSULATING PRODUCT

This application is a national stage application of PCT International Application No. PCT/IB2008/002641 filed Oct. 6, 2008. PCT/IB2008/002641 claims priority to IT Application No. MO2007A000307 filed Oct. 9, 2007. The entire contents of this application are incorporated herein by reference.

The invention relates to a composition and a method for producing an insulating product, for example an insulating panel that is usable in the construction of buildings, boats and/or aeroplanes.

In building, incombustible (or self-extinguishing) materials are widely known and used that are provided with acoustic and heat insulating properties, such as, for example: glass wool, expanded perlite, expanded vermiculite, extruded polystyrene, expanded polyurethane. The aforesaid materials are usually used to construct insulating products, for example panels for building, that are inserted into the walls and/or the roofs of buildings to reduce the acoustic and heat conductibility thereof.

A drawback of known insulating materials, which is detectable, for example, in vermiculite and in perlite, consists of the fact that the latter require the use of binders if they are used to make panels. This substantially complicates the methods used for making insulating products and makes the latter costly to produce.

Another drawback of known insulating materials, which is, for example, detectable in the polyurethane and in the polystyrene, consists of the fact that the latter are not incombustible but self-extinguishing. A material is defined as being "incombustible" when it is not subject to combustion whilst a material is defined as being "self-extinguishing" if it has the property of stopping combustion. This apparently subtle difference is in reality significant in terms of safety and fire prevention. In fact, whilst incombustible materials are substantially unattackable by fire, self-extinguishing materials are burnable if attacked by fire (as is detectable experimentally) and are able to stop combustion effectively once they have been moved away from the fire (a situation that is, however, unlikely to occur during a real fire). Further, known self-extinguishing materials comprise organic substances and produce, through the effect of the combustion, substantially harmful fumes.

A further drawback of known insulating materials, that is detectable in particular in glass wool, consists of the fact that the products produced using the latter, for example panels for building, tend to release particles (fibres) into the environment of sufficiently small dimensions to be able to be inhaled accidentally. Consequently, the glass wool can cause, or even simply contribute, to the occurrence of serial pathologies of the respiratory tract, thus being substantially harmful both for users of the panels and for the operators assigned to making and/or installing the aforesaid panels.

An object of the invention is to improve known heat and acoustic insulating materials and the corresponding production methods.

Another object is to provide a material and a method that enable the manufacture of insulating products, for example panels for building, to be made simpler and less costly.

A further object is to provide an insulating material provided with heat and acoustic insulating properties that are similar to those of the known insulating materials, and which is usable for producing insulating products, for example panels for building, without requiring the use of binders.

Another further object is to provide an insulating material provided with heat and acoustic insulating properties that are similar to those of the known insulating materials, and does not produce harmful fumes through combustion.

Still another object is to provide an insulating material provided with heat and acoustic insulating properties that are similar to those of known insulating materials, and that does not release inhalable microparticles into the environment.

In a first aspect of the invention, there is provided a composition for producing a product, comprising: an alkaline silicate, a metal hydroxide, an impermeabilising agent.

In a second aspect of the invention, there is provided a method for producing a product, including the steps of:
preparing a fluid composition by mixing together an alkaline silicate, calcium hydroxide and an impermeabilizing agent;
pouring the composition into a mold arrangement; and
heat-treating the composition so as to produce a plurality of small cavities in the composition.

In a third aspect of the invention, there is provided an apparatus for producing a product, including a mold arrangement arranged for receiving a fluid composition and a heating arrangement arranged for heat-treating the composition inside the mold arrangement, the mold arrangement being defined by a conveying device.

Owing to these aspects, a composition that is usable as insulating material, a method and an apparatus for making an insulating product are made available. The composition and the method according to the invention enable insulating products to be produced, for example panels for building, that are provided with incombustibility, heat insulating and acoustic insulating properties that are similar to those of the products obtained from known insulating materials. For example, in an insulating product obtained by the composition and/or the method according to the invention and having a density equal to approximately 40 kg/m$^3$, heat conductibility $\lambda$ is equal to 0.04 W/m·K (where: W=Watt, m metre and K=Kelvin). The aforesaid heat conductibility value $\lambda$ is the same as the heat conductibility value $\lambda$ of a known insulating material, i.e. glass wool.

The method according to the invention is less polluting, less costly and simpler to apply than known methods inasmuch as binders are not required. From a safety point of view, the composition according to the invention does not comprise substances that are able to produce harmful fumes during possible combustion, combustion that is moreover prevented by a substantial preponderance (in weight %) of silicate in the composition, as disclosed in detail below. Further, an insulating product obtained by the composition according to the invention is not able to release particles into the environment that are inhalable accidentally, thus being less dangerous for the health of users and/or workers compared with the insulating products obtained with known materials (for example, fibreglass).

In a fourth aspect of the invention, there is provided a method for producing a finely subdivided insulating material, comprising:
preparing a fluid composition by mixing together an alkaline silicate, a metal hydroxide and an impermeabilising agent;
heat-treating said composition so as to produce a plurality of small cavities in said composition;
finely subdividing said composition.

Owing to the fourth aspect of the invention, a method is made available for producing an insulating material in powder and/or granules. The latter is usable, for example, to fill gaps of building works so as to insulate the latter.

In a fifth aspect of the invention, there is provided a method, comprising:

preparing a fluid composition by mixing together an alkaline silicate, a metal hydroxide and a impermeabilising agent;

heat-treating said composition, so as to produce a plurality of small cavities in said composition;

finely subdividing said composition, so as to obtain a finely subdivided material;

pouring said material to the cavity of a product;

heat-treating said material inside said cavities.

Owing to the fifth aspect of the invention, a method is made available for insulating a product of known type, for example a hollow brick.

The composition and the methods according to the invention enables, without the use of binders, a material and an insulating product to be produced having fireproof, heat insulating and acoustic properties that are similar to those of known materials and insulating products. Consequently, the procedure for manufacturing insulating products, for example bricks and panels for building, is simplified and made less costly.

The invention will be better understood and implemented with reference to the attached drawings, that show an embodiment thereof by way of non-limiting example, in which.

With reference to the FIG. 1, a mixture C that is usable for producing an insulating product, for example a building panel, is obtained from a liquid composition having an average percentage formula expressed in the following Table 1:

TABLE 1

| Component | % range in weight |
| --- | --- |
| Alkaline silicate (in water solution) | 89.9-99.7 |
| Metal hydroxide | 0.1-10 |
| Impermeabilising agent | 0.1-5 |

The alkaline silicate water solution comprises a weight percentage of silicate comprised between 25% and 40%. The alkaline silicate comprises: sodium polysilicate ($Na_2O.nSiO_2$) and/or potassium polysilicate ($K_2O.nSiO_2$). The silicate is of alkaline type inasmuch as it has a $SiO_2/Na_2O$ (or $SiO_2/K_2O$) ratio comprised between 1.6 and 2.5.

In an embodiment, the alkaline silicate is equal to about 94% of the composition.

The metal hydroxide is used inasmuch as it is able to bind the ions $Na^+$ (or $K^4$), thus producing insoluble calcium silicates. The metal hydroxide may comprise calcium hydroxide ($Ca(OH)_2$), lithium hydroxide (LiOH), magnesium hydroxide ($Mg(OH)_2$), aluminium hydroxide ($Al(OH)_3$), or a mix of these hydroxides.

In an embodiment, the metal hydroxide is equal to about 5% of the composition.

The impermeabilising agent comprises liquid silicone (for example, a siloxane), that makes a product obtained by the composition in the Table impermeable to water, and thus resistant to humidity.

In an embodiment, the impermeabilising agent is equal to approximately 1% of the composition.

Figure 1:
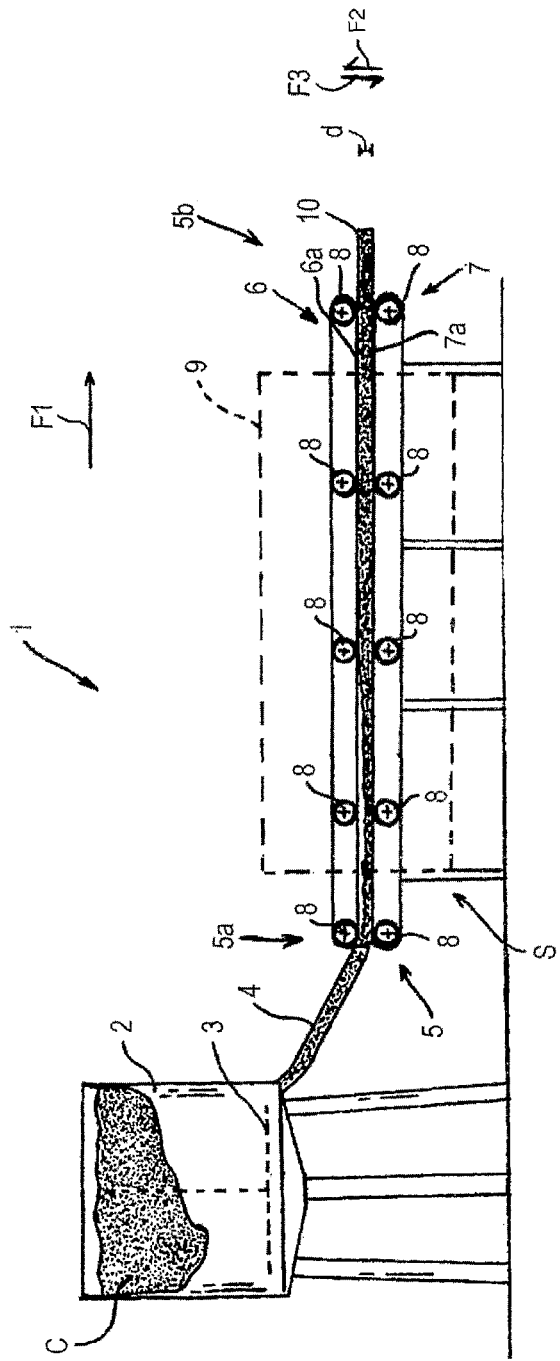
FIG. 1 is a partially sectioned schematic side view, showing an apparatus with which to produce an insulating product.

FIG. 1 shows an apparatus 1, by means of which it is possible to make a building product 10, for example an insulating panel. A tank 2, provided with a mixing device 3 of known type (shown by a dashed line), is filled with the silicate water solution, the metal hydroxide and the impermeabilising agent, according to the weight percentages disclosed above.

In an embodiment that is not shown, colouring agents are also fed into the tank 2, for example pigments, in a weight percentage equal to 0.5-1% of the composition. In this manner, the product 10 can be coloured in the desired way.

In another embodiment that is not shown, fibres are also fed into the tank 2, the fibres can be inorganic (for example, fibreglass) and/or vegetable (for example, jute or cocoa fibre) and are provided in a weight percentage equal to 0.5-1% of the composition. The aforesaid fibres act by increasing the mechanical resistance of the product 10.

In a further embodiment that is not shown, calcium stearate ($[CH_3(CH_2)_{16}COOH]_2Ca$) is fed into the tank 2 as a further impermeabilising agent, with a weight percentage equal to 0.1-5% of the composition.

By driving the mixing device 3, the various components are mixed together so as to produce a liquid mixture C that, via a conduit 4, is transferred to a conveying device 5. In an embodiment that is not shown, the conduit is provided with a pumping element that facilitates the transfer of the mixture C.

The conveying device 5 is partially housed in a tunnel kiln 9 (shown by a dashed line), of known type, that is able to reach temperatures up to 450° C. The conveying device 5 comprises a pair of belt conveyors 6, 7 of known type that are horizontally superimposed on one another and are interposed between two side baffles (that are not shown), that are parallel to one another. Each side baffle is arranged vertically with respect to an adjacent side of the conveying device 5 and extends along the entire length of the latter. Each conveyor belt 6, 7 comprises a corresponding belt 6a, 7a, that is coated with an anti-adhering material, for example polytetrafluoroethylene (PTFE), and is driven by a plurality of motorized rollers 8. As the two belt conveyors 6, 7 are horizontally superimposed, the corresponding belts 6a, 7a are overlapping and partially mutually facing. When the conveying device 5 is operating, each belt 6a, 7a slides in contact with a stiff plane (that is not shown), for example made of steel. The two belt conveyors 6, 7 are supported by a supporting frame S, maintaining the two mutually overlapping and parallel belt conveyors 6, 7. The supporting frame S is provided with a positioning device (that is not shown), comprising a plurality of worm screws interacting with a corresponding plurality of lead screw elements. The worm screws (driven by motors) are mounted on side portions of the conveyor belt 6 (or 7), whilst the respective lead screw elements are mounted on corresponding side portions of the other conveyor belt 7 (or 6). By rotating the worm screws clockwise, or anticlockwise, it is possible to move the conveyor belt 7 vertically in relation to the conveyor belt 6, according to two parallel and opposite directions indicated by the arrows F2 and F3. The conveyor belt 6 and the conveyor belt 7 can be moved away from and/or towards one another, so as to vary (i.e. increase and/or decrease) a distance d comprised between the respective belts 6a, 7a and defining the thickness of the product 10 producible by the apparatus 1.

Once the mixture C has been conveyed by the conduit 4 to an inlet end 5a of the conveying device 5 it expands on the surface of the belt 7a that, together with the belt 6a above, runs in an advancing direction F1 to an outlet end 5b of the conveying device 5, opposite the inlet end 5a. Proceeding in the advancing direction F1, the mixture C is subjected to the action of a high temperature, within the range of 200° C. and 450° C., generated inside the tunnel kiln 9.

Through the effect of the heat treatment to which the mixture C is subjected the water contained in the latter (arising from the silicate water solution) is progressively heated until it forms water vapour bubbles inside the mixture C that consequently expands in volume. As the heat treatment continues, the bubbles inside the mixture C explode, forming in the latter a plurality of small cavities, or pores that provide the mixture C with a cellular structure.

For the entire duration of the aforesaid heat treatment the mixture C remains confined in a sort of "mould cavity", that is approximately parallelpipedon-shaped and is defined overall by the belt 6*a*, by the belt 7*a* (and by the stiff planes in contact with which the belt 6*a* and the belt 7*a* run) and by the side baffles flanking the two belt conveyors 6 and 7. This "mould cavity" defines the shape and dimensions of the product 10. Consequently, the product 10, when it exits the conveying device 5 at the outlet end 5*b*, is also substantially parallelpipedon-shaped, having a width that is the same as the width of each belt 6*a*, 7*a* and a thickness that is equal to the distance d comprised between belt 6*a* and the belt 7*a*. In order to vary the thickness of the product 10, it is sufficient to vary in an appropriate manner the distance d from the positioning device comprised in the supporting frame S. The duration of the heat treatment varies in function of the final thickness of the product 10 to be produced and is anyway comprised between 1 h and 6 h. In order to vary the duration of the heat treatment it is sufficient to vary the advancing speed of the belt conveyors 6 and 7 in the advancing direction F1. Further, by appropriately adjusting the maximum temperature at which heat treatment is conducted, it is possible to vary the properties, and thus the use, of the product 10. In fact, if the maximum temperature applied is approximately 250° C., the mixture C is not completely dehydrated, inasmuch as the water bound in the components of the mixture does not evaporate and the product 10 thus obtained is provided with optimal fireproof properties. If, on the other hand, the maximum applied temperature is approximately 400-450° C., the mixture C is completely dehydrated, as also the bound water is removed and the product 10 obtained thereby is particularly effective in ensuring heat insulation.

Downstream of the outlet end 5*b* of the conveying device 5, there is provided a cutting station (that is not shown), provided with a cutting member (blade) that is drivable alternatively in the two directions F2 and/or F3. The cutting member enables the product 10 exiting the conveying device 5 to be cut at preset intervals so as to produce, for example, a plurality of panels having a rectangular plan shape.

In an embodiment that is not shown, on each belt 6*a*, 7*a* a coating sheet is positioned that may comprise: paper, aluminium, plastic film, vegetable-fibre film. Consequently, the produced product 10 is enclosed in a protective casing, that increases the mechanical and/or insulating properties thereof.

In another embodiment that is not shown, the product 10 exiting the conveying device 5 is immersed in an impermeabilising bath, comprising a silicone water solution or a diluted sulphuric acid water solution.

In a further embodiment that is not shown, the conveying device 5 comprises two pairs of horizontally overlapping belt conveyors, conformed and functioning in a similar manner to the belt conveyors 6, 7 disclosed above. The two pairs of belt conveyors are mutually aligned along the advancing direction F1, the cutting station is positioned at the adjacent ends of the two pairs and the cutting member works inside the tunnel kiln.

By shaping in a suitable manner (according to known procedures) the belts 6*a* and 7*a*, it is possible to vary the shape and dimensions of the product 10, so that the latter can be used, not only in building but also for insulating hulls of boats, fuselages of aeroplanes and railway carriages.

In a still further embodiment that is not shown, instead of the apparatus 1 single moulds are used having a desired shape and dimensions, into which the liquid mixture C is poured. In the moulds coating sheets can be positioned that are made of: paper, aluminium, plastic film, vegetable-fibre film. The moulds are then inserted into a kiln of known type that is able to reach and maintain temperatures comprised between 200° C. and 450° C. and similar heat treatment to that disclosed above is performed.

Owing to the cellular structure that is generated in the mixture C through the effect of the heat treatment, the product 10 has optimal acoustic and heat insulating properties and a specific weight that is less than that of known insulating products.

Further, producing the product 10 does not require the use of binders, it thus being less costly than known insulating products. Owing to the absence of chemical binders in the mixture C, the product 10 can be disposed of as simple solid urban waste rather than as industrial waste and can even be recycled. Owing to the preponderance (in weight %) of the silicate in the mixture C, the product 10 is incombustible.

In an embodiment that is not shown, the liquid mixture C prepared in the tank 2 is fed into a dryer/centrifugator of known type (for example, the "Turbo Dryer" apparatus produced by VOMM S.p.A.), in which the mixture C is simultaneously heat-treated and finely divided, i.e. is transformed into an insulating material in powder (or granules). During heat treatment, which is performed at temperatures comprised between 100° C. and 400° C., in the mixture C the water is progressively heated until it forms bubbles of water vapour that cause the mixture C to expand in volume. As the heat treatment continues, the bubbles inside the mixture C explode, forming in the latter a plurality of small cavities (pores), which provide the mixture C with a cellular structure. As the mixture C is also centrifuged during the aforesaid heat treatment, a finely subdivided material, in the form of powder or granules is obtained as a finished product.

The insulating material in powder (or granules) according to the invention has the same insulating, acoustic and fireproof properties as the products 10 that are obtainable by the apparatus 1. Thus the insulating powder material can be used directly to fill and insulate the gaps of floors and/or walls, or to fill bags made of biodegradable material (of vegetable origin) or of thermoreflective material (aluminium), that are in turn inserted into the aforesaid gaps. Further, the insulating material in powder according to the invention, having a lesser specific weight than other known insulating materials, can be mixed with clay and used both as a lightening and an insulating material with which to produce building products, for example, bricks.

In another embodiment that is not shown, the insulating material in powder according to the invention is obtained by milling a product 10.

Figure 2:
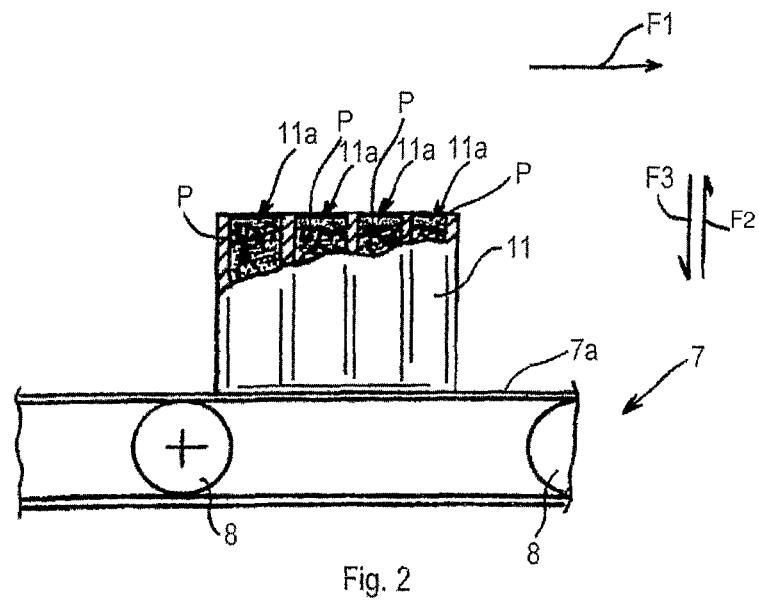
FIG. 2 is a fragmentary and incomplete partially sectioned schematic prospective view showing a step of a method for insulating a product.
Figure 3:
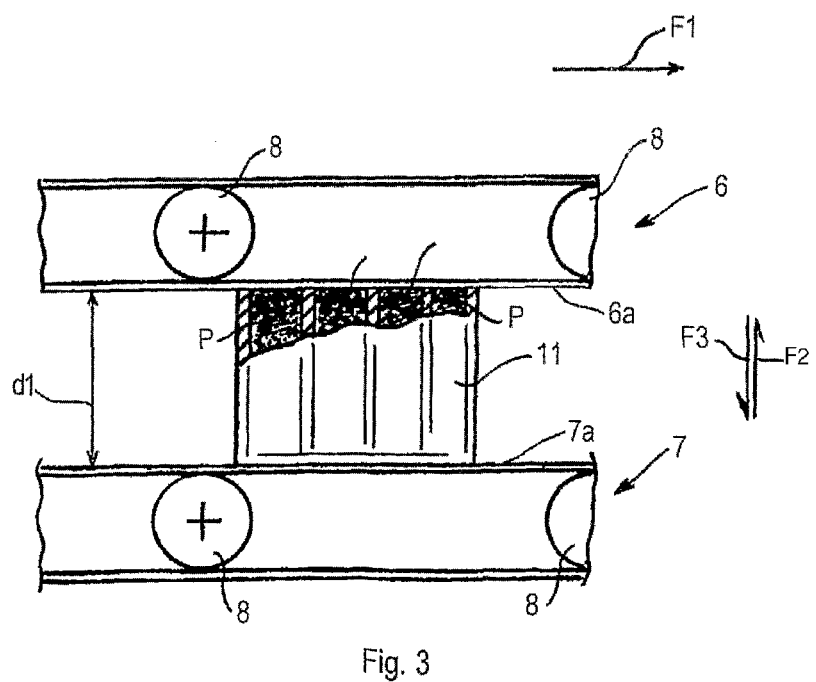
FIG. 3 is a view like that in FIG. 2, showing a further step of the method for insulating a product.

The operating parameters of the drying/centrifugator apparatus can be set so as to produce, starting with the liquid mixture C, a material in powder (or granules) that is not completely dehydrated and not completely expanded. This can be obtained, for example, by performing heat treatment at temperatures comprised between 100° C. and 250° C. FIGS. 2 and 3 illustrate a manner of use of the apparatus 1 for producing the aforesaid material in powder not completely dehydrated and not completely expanded. After moving the conveyor belt 6 and the conveyor belt 7 of the conveying device 5 away from one another, so as to obtain a suitable distance d1, a building product provided with cavities, for example a drilled brick 11, provided with holes 11a and ground, is positioned on the belt 7a of the conveyor belt 7 (i.e. on the conveyor belt positioned below in the conveying device 5). In this manner, by means of a dispensing device of known type (that is not shown) it is possible to pour the aforesaid material in powder that is not completely dehydrated and expanded (indicated in FIGS. 2 and 3 by letter P) into the holes 11a. Once the holes 11a (FIG. 2) have been filled completely, the positioning device is again driven to move the conveyor belt 6 and the conveyor belt 7 closer to make the distance d the same as the height of the drilled brick 11. In this manner, the material in powder P remains confined inside the holes 11a. It is thus possible, by driving the conveying device 5, to move in the advancing direction F1 the drilled brick 11, so as to heat the latter to about 400-450° C. and dry completely the material in powder P. The latter, through the effect of the heat treatment, expands inside the holes 11a, but cannot exit the latter inasmuch as it is immobilised there by the belt 6a and by the belt 7a of the conveying device 5. When the drilled brick 11 exits the outlet end 5b of the conveying device 5, the material in powder P that fills the holes 11a is completely expanded and dried.

In an embodiment that is not shown, the drilled brick 11 is inserted into a mould made in a shapingly coupled manner with the drilled brick 11. After filling the holes 11a with the material in powder P the mould is closed and inserted into a kiln of known type, inside which the brick 11 is heat-treated at a temperature of approximately 400-450° C., i.e. in a similar manner to what is disclosed above with reference to FIGS. 2 and 3.

It is thus possible to transform a common drilled brick into a building product provided with optimum acoustic insulating and heat properties.

The invention claimed is:

1. Method for producing a finely subdivided insulating material, comprising the steps of:
    preparing a fluid composition by mixing together an alkaline silicate, a metal hydroxide, and an impermeabilising agent comprising liquid silicone;
    heat-treating said composition, so as to produce a plurality of small cavities in said composition; and
    finely subdividing said composition, wherein said preparing step comprises adding pigments in a weight percentage comprised between 0.5% and 1%.

2. Method for producing a finely subdivided insulating material, comprising the steps of:
    preparing a fluid composition by mixing together an alkaline silicate, a metal hydroxide, an impermeabilising agent comprising liquid silicone and calcium stearate in a weight percentage comprised between 0.1% and 5%;
    heat-treating said composition, so as to produce a plurality of small cavities in said composition; and
    finely subdividing said composition.

* * * * *